(12) United States Patent
Werner et al.

(10) Patent No.: US 6,485,072 B1
(45) Date of Patent: Nov. 26, 2002

(54) BUMPER SYSTEM FOR MOTOR VEHICLES

(75) Inventors: Donald Paul Werner, Canton; Gregory Stanley Frederick, Sterling Hts; Jeffrey Leonard Bladow, West Bloomfield; Shui-Fang (Ray) Chou, Troy, all of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/707,110

(22) Filed: Nov. 6, 2000

Related U.S. Application Data

(60) Provisional application No. 60/170,935, filed on Dec. 15, 1999.

(51) Int. Cl.[7] .............................. B60R 19/26; B60J 7/00
(52) U.S. Cl. ..................... 293/132; 293/133; 293/120; 293/121; 296/189
(58) Field of Search ................... 293/132, 133, 293/120, 121; 296/189

(56) References Cited

U.S. PATENT DOCUMENTS

| | | |
|---|---|---|
| 1,581,432 A | 2/1926 | Fageol |
| 1,935,447 A | 11/1933 | Hoffman |
| 2,604,349 A | 7/1952 | Martinetz |
| 2,753,193 A | 7/1956 | Halverson |
| 2,828,144 A | 3/1958 | Hosmer |
| 3,412,628 A | 11/1968 | De Gain |
| 3,495,474 A | 2/1970 | Nishimura et al. |
| 3,578,358 A | 5/1971 | Reynolds |
| 3,739,882 A | 6/1973 | Schweak et al. |
| 3,819,224 A | 6/1974 | Casey et al. |
| 3,831,997 A | 8/1974 | Myers |
| 3,885,817 A | 5/1975 | Christian |
| 3,888,515 A | 6/1975 | Winter |
| 3,897,095 A * | 7/1975 | Glance et al. ............... 293/71 |
| 3,905,630 A | 9/1975 | Cantrell |
| 3,912,295 A * | 10/1975 | Eggert ........................ 293/63 |
| 3,930,670 A | 1/1976 | Haskins |
| 3,933,387 A * | 1/1976 | Salloum et al. ............. 293/71 |
| 3,938,841 A | 2/1976 | Glance et al. |
| 3,964,768 A | 6/1976 | Reynolds |
| 3,997,207 A | 12/1976 | Norlin |
| 3,998,485 A | 12/1976 | Putter et al. |
| 4,023,652 A | 5/1977 | Torke |
| 4,190,276 A | 2/1980 | Hirano et al. |
| 4,200,318 A * | 4/1980 | Gute et al. ................. 293/136 |
| 4,272,114 A | 6/1981 | Hirano et al. |
| 4,328,986 A * | 5/1982 | Weller et al. .............. 293/120 |
| 4,348,042 A * | 9/1982 | Servo ........................ 293/120 |
| 4,457,547 A * | 7/1984 | Sekiyama et al. ......... 293/120 |
| 4,465,312 A * | 8/1984 | Werner ..................... 293/132 |
| 4,466,646 A | 8/1984 | Delmastro et al. |
| 4,468,052 A | 8/1984 | Koike |
| 4,597,601 A * | 7/1986 | Manning ................... 293/133 |
| 4,829,979 A | 5/1989 | Moir |
| 4,830,686 A | 5/1989 | Hashiguchi et al. |
| 4,893,856 A | 1/1990 | Council |
| 4,901,486 A | 2/1990 | Kobori et al. |
| 4,940,270 A | 7/1990 | Yamazaki et al. |
| 5,005,887 A * | 4/1991 | Kelman ..................... 293/120 |

(List continued on next page.)

FOREIGN PATENT DOCUMENTS

| | | |
|---|---|---|
| DE | 2 137 517 | 2/1973 |
| GB | 2 307 665 | 6/1997 |

Primary Examiner—Ken Patel
(74) Attorney, Agent, or Firm—Raymond L. Coppiellie

(57) ABSTRACT

A bumper system for a motor vehicle includes an energy absorber and a bumper beam connected to the energy absorber and for connection to vehicle structure and having a general B shape. The bumper system also includes a member disposed between the bumper beam and a rail of the motor vehicle to absorb energy during an impact with an object by the bumper system.

12 Claims, 14 Drawing Sheets

U.S. PATENT DOCUMENTS

| | | | |
|---|---|---|---|
| 5,056,840 A | * 10/1991 | Eipper et al. | 293/120 |
| 5,078,439 A | * 1/1992 | Terada et al. | 293/121 |
| 5,080,411 A | * 1/1992 | Stewart et al. | 293/122 |
| 5,116,092 A | 5/1992 | Schönleber | |
| 5,154,462 A | * 10/1992 | Carpenter | 293/120 |
| 5,201,912 A | 4/1993 | Terada et al. | |
| 5,273,330 A | 12/1993 | Petry et al. | |
| 5,290,078 A | * 3/1994 | Bayer et al. | 293/120 |
| 5,306,058 A | 4/1994 | Sturrus et al. | |
| 5,314,229 A | 5/1994 | Matuzawa et al. | |
| 5,387,002 A | 2/1995 | Grevich | |
| 5,393,111 A | * 2/1995 | Eipper et al. | 293/120 |
| 5,419,416 A | 5/1995 | Miyashita et al. | |
| 5,431,445 A | 7/1995 | Wheatley | |
| 5,688,006 A | 11/1997 | Bladow et al. | |
| 5,722,708 A | 3/1998 | Jonsson | |
| 5,727,804 A | 3/1998 | Metzger | |
| 5,732,801 A | 3/1998 | Gertz | |
| 5,785,367 A | 7/1998 | Baumann et al. | |
| 5,803,514 A | 9/1998 | Shibuya et al. | |
| 5,853,187 A | 12/1998 | Maier | |
| 5,876,078 A | 3/1999 | Miskech et al. | |
| 5,967,592 A | * 10/1999 | Freeman | 293/120 |
| 6,000,738 A | 12/1999 | Stewart et al. | |
| 6,003,912 A | * 12/1999 | Schonhoff et al. | 293/122 |
| 6,042,163 A | 3/2000 | Reiffer | |
| 6,059,331 A | 5/2000 | Mori | |
| 6,089,628 A | * 7/2000 | Schuster | 293/120 |
| 6,179,353 B1 | * 1/2001 | Heatherington et al. | 293/120 |
| 6,179,355 B1 | 1/2001 | Chou et al. | |
| 6,217,089 B1 | 4/2001 | Goto et al. | |
| 6,227,582 B1 | * 5/2001 | Ichien | 293/132 |

* cited by examiner

BUMPER SYSTEM FOR MOTOR VEHICLES

CROSS-REFERENCE TO RELATED APPLICATION

The present application claims priority from provisional application Serial No. 60/170,935, filed Dec. 15, 1999.

BACKGROUND OF THE INVENTION

1. Field of the Invention

The present invention relates generally to bumpers for motor vehicles and, more specifically, to a bumper system for a motor vehicle.

2. Description of the Related Art

It is known to provide a bumper system for a front end or rear end of a motor vehicle. For a front end of the motor vehicle, the bumper system typically includes a bumper beam extending transversely and secured to a forward end of a pair of front rails, which extend longitudinally and are spaced transversely. The bumper system also includes an energy absorber extending transversely and secured to the bumper beam. The bumper system may include a fascia disposed over and covering the energy absorber.

It is also known that the bumper system protects a body of the motor vehicle from low speed impact with an object through elastic or semi-plastic deformation of the energy absorber. It is further known that the bumper system is an absorber for high-speed impact with an object through major plastic deformation of the bumper beam. It is yet further known that bumper beams of bumper systems tend to buckle at a centerline in an uncontrolled fashion during low and highspeed impacts.

Although the above bumper system has worked, it suffers from the disadvantage that the bumper beam has a constant cross-section which is either too weak to resist low speed impact at a center thereof or makes it too strong to absorb impact energy before the supporting vehicle rails collapse under the motor vehicle. As a result, it is desirable to provide a bumper system having a bumper beam which will better balance both low speed impact protection and high speed energy absorption for a bumper system of a motor vehicle. It is also desirable to provide a reinforcement for a bumper beam that reduces damage to the bumper beam at low speed impacts but allows the bumper beam to crush at high-speed impacts. It is further desirable to provide a metal device positioned behind or inside a bumper beam that when impacted crushes with an efficient and effective energy curve. Therefore, there is a need in the art to provide a bumper system that meets these desires.

SUMMARY OF THE INVENTION

Accordingly, the present invention is a bumper system for a motor vehicle. The bumper system includes an energy absorber and a bumper beam connected to the energy absorber and for connection to vehicle structure and having a general B shape. The bumper system also includes a member disposed between the bumper beam and a rail of the motor vehicle to absorb energy during an impact with an object by the bumper system.

One advantage of the present invention is that a new bumper system is provided for a motor vehicle. Another advantage of the present invention is that the bumper system includes a bumper beam made from a manufacturing process such as a roll formed process or an extrusion process with a generally "B" shaped cross-section which balances both low-speed impact and high-speed impact of the motor vehicle. Yet another advantage of the present invention is that the bumper system has a reinforcement attached to a "B" shaped bumper beam that reduces damage to the bumper beam at a low speed impact but allows the bumper beam to crush at a high-speed impact. Still another advantage of the present invention is that the bumper system includes a centerline bumper reinforcement of unique cross-sectional geometry, allowing the bumper beam to crush at high speed yet resist low speed damage. A further advantage of the present invention is that the bumper beam reinforcement resists excessive centerline bending deformation. Yet a further advantage of the present invention is that the bumper system includes a metal device is positioned behind or inside a vehicle bumper beam that when impacted crushes with an efficient and effective energy curve. Still a further advantage of the present invention is that the metal device is relatively low cost to manufacture compared to more expensive hydraulic strut assemblies. Another advantage of the present invention is that the metal device has a unique geometry and simplicity and crushes in a very efficient manner. Yet another advantage of the present invention is that the metal device reduces cost during repair of a vehicle after an incidental collision. Still another advantage of the present invention is that the metal device is low cost to manufacture, lighter than traditional strut designs, low cost to assembly and service in the field, very efficient crush characteristics (square load-deflection curve), ease of design flexibility for different vehicles, ease of design to commonize part between vehicles, greatly reduces the cost to repair, and offers a controlled joint to bumper beam which allows for improved high speed energy management with lower intrusion into an occupant compartment of the vehicle.

Other features and advantages of the present invention will be readily appreciated, as the same becomes better understood, after reading the subsequent description when considered in connection with the accompanying drawings.

DESCRIPTION OF THE PREFERRED EMBODIMENT(S)

Figure 1:
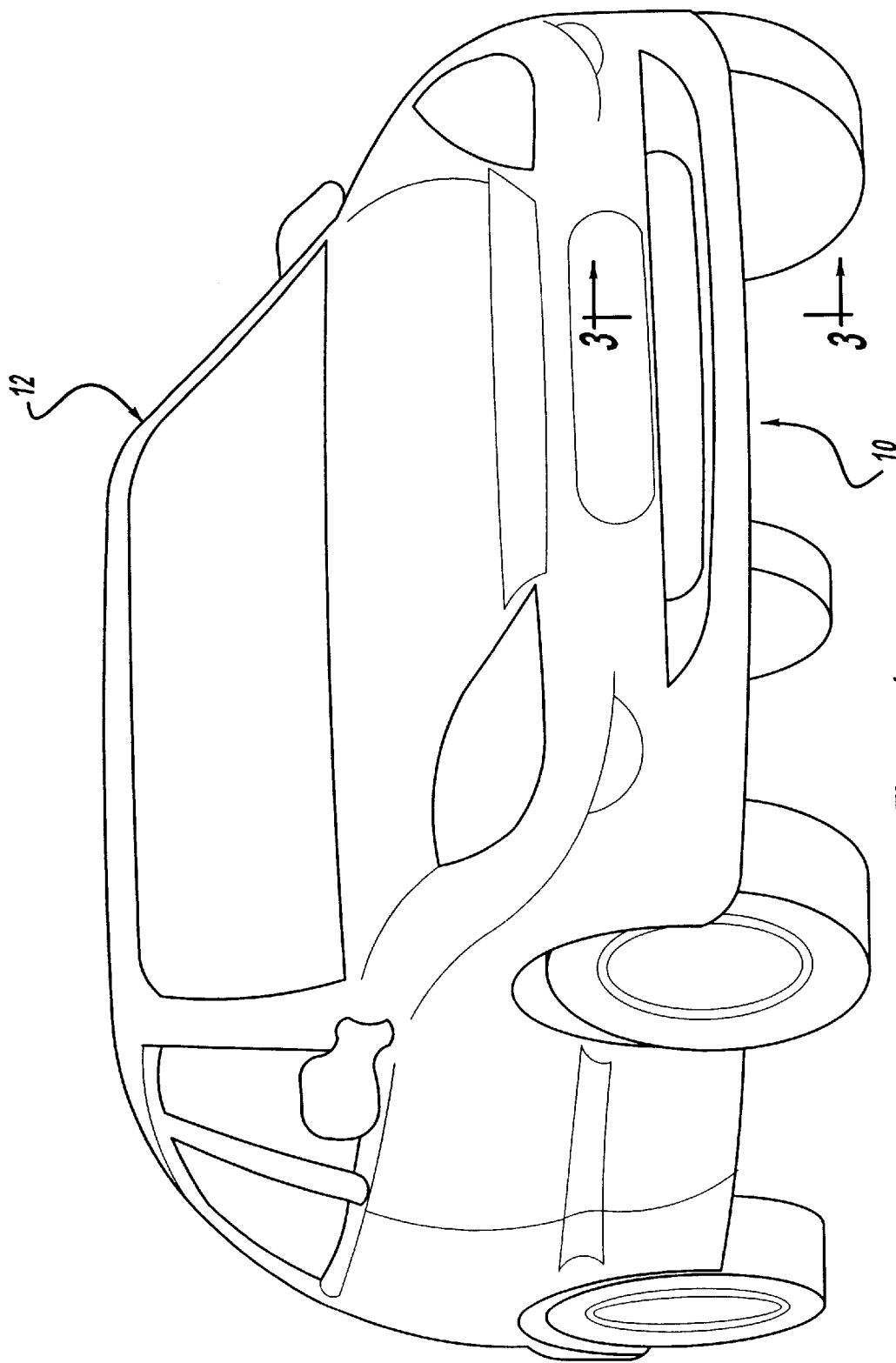
FIG. 1 is a perspective view of a bumper system, according to the present invention, illustrated in operational relationship with a motor vehicle.
Figure 2:
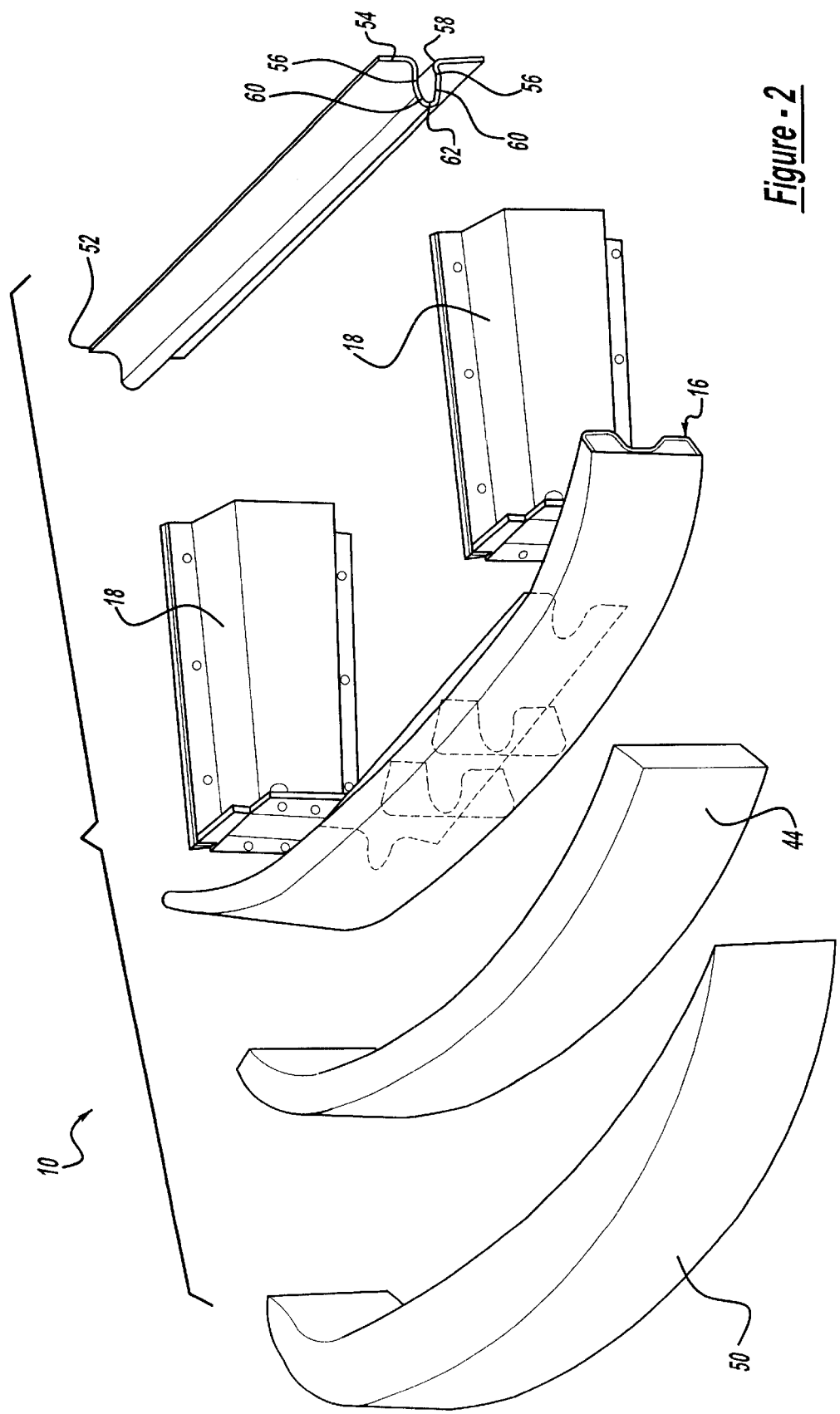
FIG. 2 is an exploded perspective view of the bumper system of FIG. 1.

Referring to the drawings and in particular FIG. 1, one embodiment of a bumper system 10, according to the present invention, is illustrated in operational relationship with a motor vehicle, generally indicated at 12. The bumper system 10 is disposed at a front or forward end of the motor vehicle 12. It should be appreciated that the bumper system 10 may be disposed at a rear or rearward end of the motor vehicle 12. It should also be appreciated that, except for the bumper system 10, the motor vehicle 12 is conventional and known in the art.

As illustrated in FIGS. 2 through 6, the bumper system 10 includes a bumper beam, generally indicated at 16. The bumper beam 16 extends laterally and is secured to a forward end 17 of a pair of front rails 18 by suitable means such as welding or mechanical fastening. The bumper beam 16 is a hollow member having a general "B" cross-sectional shape. The bumper beam 16 has a front or impact wall 20 extending generally vertically and laterally. The bumper beam 16 also has an upper or top wall 22 and a lower or bottom wall 24 inclined longitudinally from the impact wall 20 and extending laterally. The bumper beam 16 has a curved or arcuate forward corner wall 26 interconnecting the impact wall 20 and the upper and lower walls 22 and 24. The bumper beam 16 also has a rear or supporting wall 28 extending generally vertically and laterally from the upper and lower walls 22 and 24. The bumper beam 16 has a curved or arcuate rear corner wall 30 interconnecting the supporting wall 28 and the upper and lower walls 22 and 24. It should be appreciated that the impact wall 20 has a height greater than the supporting wall 28.

The bumper beam 16 also has a plurality of, preferably two generally horizontal interior walls 32 extending laterally and longitudinally forward toward the impact wall 20. The bumper beam 16 has a curved or arcuate inner corner wall 34 interconnecting the interior walls 32 and supporting wall 28. The bumper beam 16 has an inclined transition wall 36 extending laterally and longitudinally forward from the interior walls 32 and toward a center of the impact wall 20 and a curved or arcuate projection wall 38 interconnecting the ends of the transition walls 36. The impact wall 20 is formed as two portions with each portion extending from the front corner walls 26 and spaced vertically from each other to form a gap 40 therebetween. The projection wall 38 is secured to the upper and lower portions of the impact wall 20 by suitable means such as welding or mechanical fastening to increase a stability of the bumper beam 16 against a "match boxing" behavior. The upper and lower portions of the impact wall 20 have a plurality of apertures 42 extending therethrough and spaced laterally for a function to be described.

Figure 3:
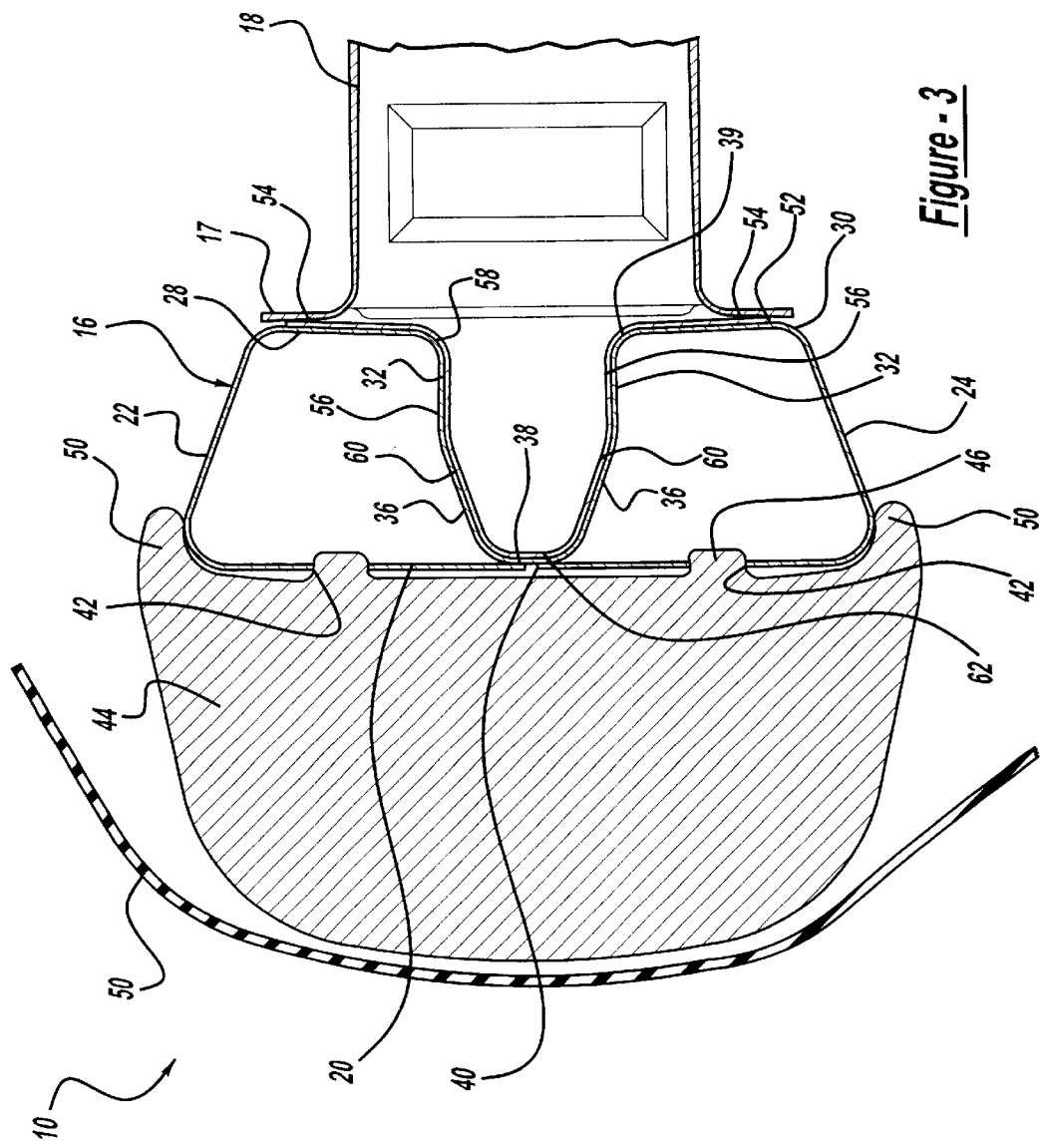
FIG. 3 is a sectional view taken along line 3—3 of FIG. 1.
Figure 4:
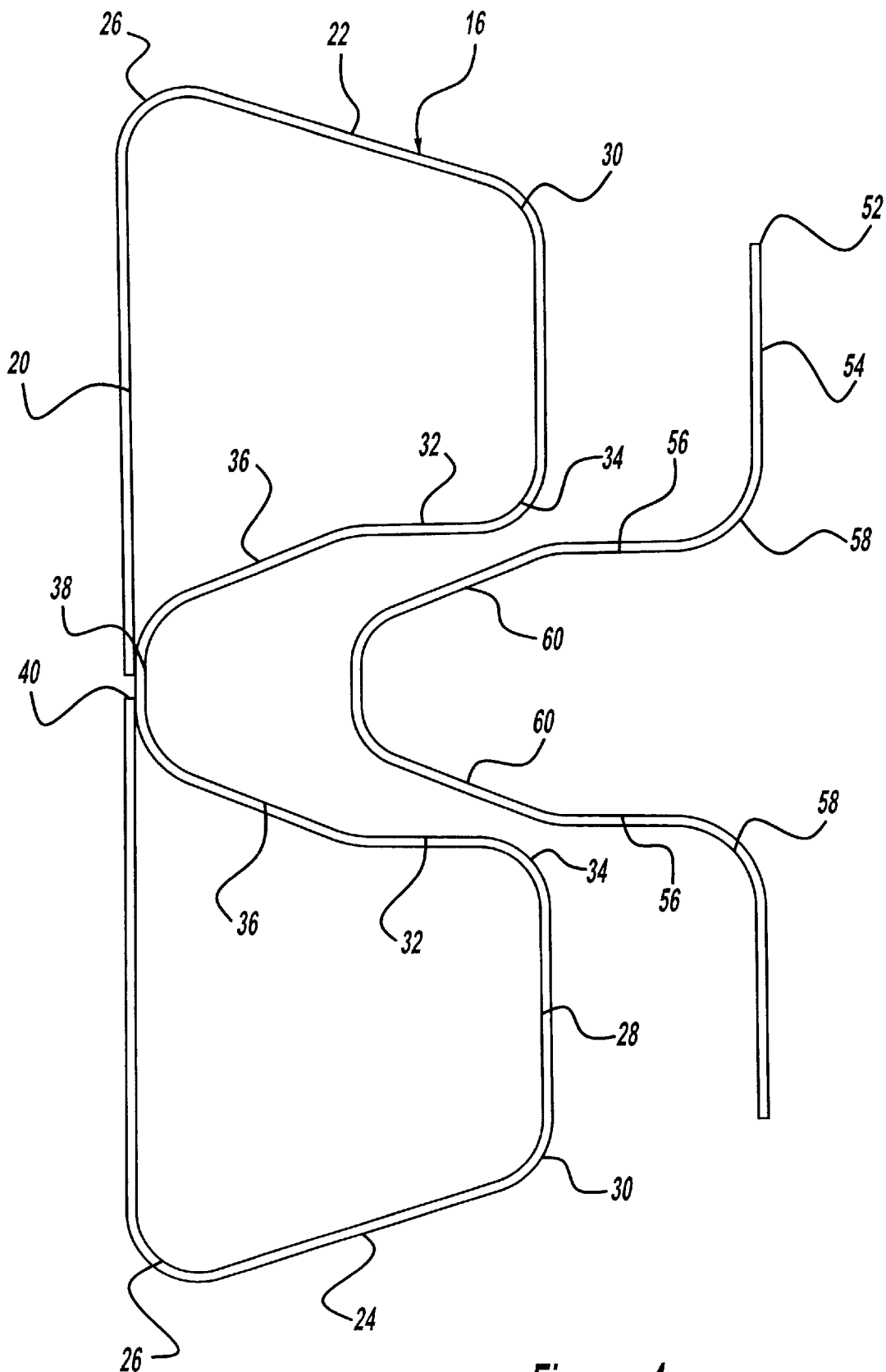
FIG. 4 is an exploded elevational view of a bumper beam and reinforcement of the bumper system of FIG. 1.
Figure 5:
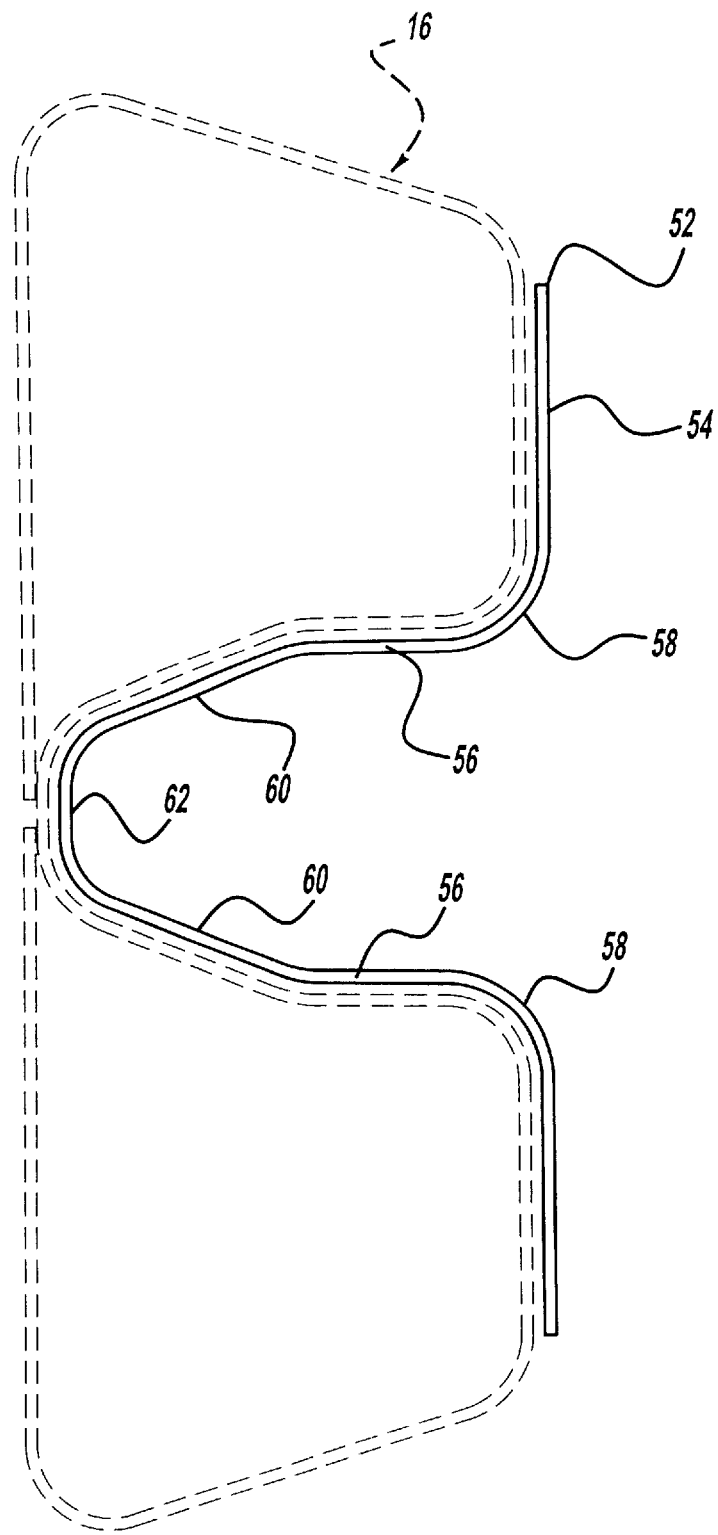
FIG. 5 is an elevational view of a bumper beam and reinforcement of the bumper system of FIG. 1.

As illustrated in FIG. 3, a top wall of the rail 18 is located vertically between the upper wall 22 and the top interior wall 32 of the bumper beam 16 and a lower wall of the rail 18 is located vertically between the lower wall 24 and the lower interior wall 32 of the bumper beam 16 in a symmetrical manner. As a result, the stiffness of the rail 18 causes the two interior walls 32 to collapse prior to the upper and lower walls 22 and 24 collapse. It should be appreciated that this overlapping collapse assures a uniform energy absorption characteristic in high-speed impacts. It should also be appreciated that the walls 22, 24, and 32 may have a plurality of apertures (not shown) extending therethrough to achieve a desired crush stiffness of the bumper beam 16.

The bumper beam 16 is made of a relatively rigid material such as metal. The bumper beam 16 is integral, unitary, and formed as one-piece by manufacturing processes such as roll forming which a conventional process known in the art. It should also be appreciated that other manufacturing processes such as extruding and stamping may be used to form the bumper beam 16. It should also be appreciated that the bumper beam 16 may be attached to a rearward end (not shown) of a pair of rear rails (not shown) of the motor vehicle 12 by suitable means such as welding.

The bumper system 10 includes an energy absorber 44. The energy absorber 44 extends laterally and is secured to the bumper beam 16. The energy absorber 44 has a plurality of projections 46 extending rearward therefrom and through the apertures 42 in the impact wall 20. The energy absorber 44 is a solid member having a generally trapezoidal shape with rear upper and lower lips 48 and 50 extending rearward. The upper and lower lips 48 and 50 have a generally arcuate or curved shape to extend over the front corner walls 26 of the bumper beam 16. The energy absorber 44 is made of a relatively deformable material such as foam. The bumper beam 16 may have a horizontal sweep to reduce the depth of the deformable material of the energy absorber 44. It should be appreciated that the apertures 42 in the impact wall 20 allow the energy absorber 44 to have local penetration in order to avoid excess compacting of the deformable material during a high-speed impact with an object (not shown).

The bumper system 10 further includes a fascia 50 extending laterally and vertically to cover the energy absorber 44. The fascia 50 is secured to vehicle structure (not shown) by suitable means such as fasteners (not shown). The fascia 50 is made of a relatively rigid material such as plastic. It should be appreciated that the fascia 50 is conventional and known in the art.

The bumper system 10 also includes a reinforcement 52 disposed between the rails 18 and the bumper beam 16 to resist excessive centerline bending deformation and improve global stiffness of the bumper beam 16. The reinforcement 52 has a rear or base wall 54 extending generally vertically and laterally. The reinforcement 52 also has a plurality of, preferably two generally horizontal side walls 56 extending laterally and longitudinally forward from the base wall 54. The reinforcement 52 has a curved or arcuate corner wall 58 interconnecting the side walls 56 and the base wall 54. The reinforcement 52 has an inclined transition wall 60 extending laterally and longitudinally forward from the side walls 56 and a curved or arcuate projection wall 62 interconnecting the ends of the transition walls 60. The reinforcement 52 is made of a metal material such as steel and is formed as a one-piece stamping by a stamping process, which is conventional and known in the art The reinforcement 52 has the base wall 54 secured to the upper and lower portions of the rails 18 by suitable mean such as welding. The reinforcement 52 also has the projection wall 62 disposed adjacent the projection wall 38, the transition walls 60 disposed adjacent the transition walls 36, the side walls 56 disposed adjacent the interior walls 32, and the base wall 54 adjacent the supporting wall 28 and secured thereto by suitable means such as welding. The reinforcement 52 is a monolithic structure being integral, unitary, and one-piece.

Figure 6:
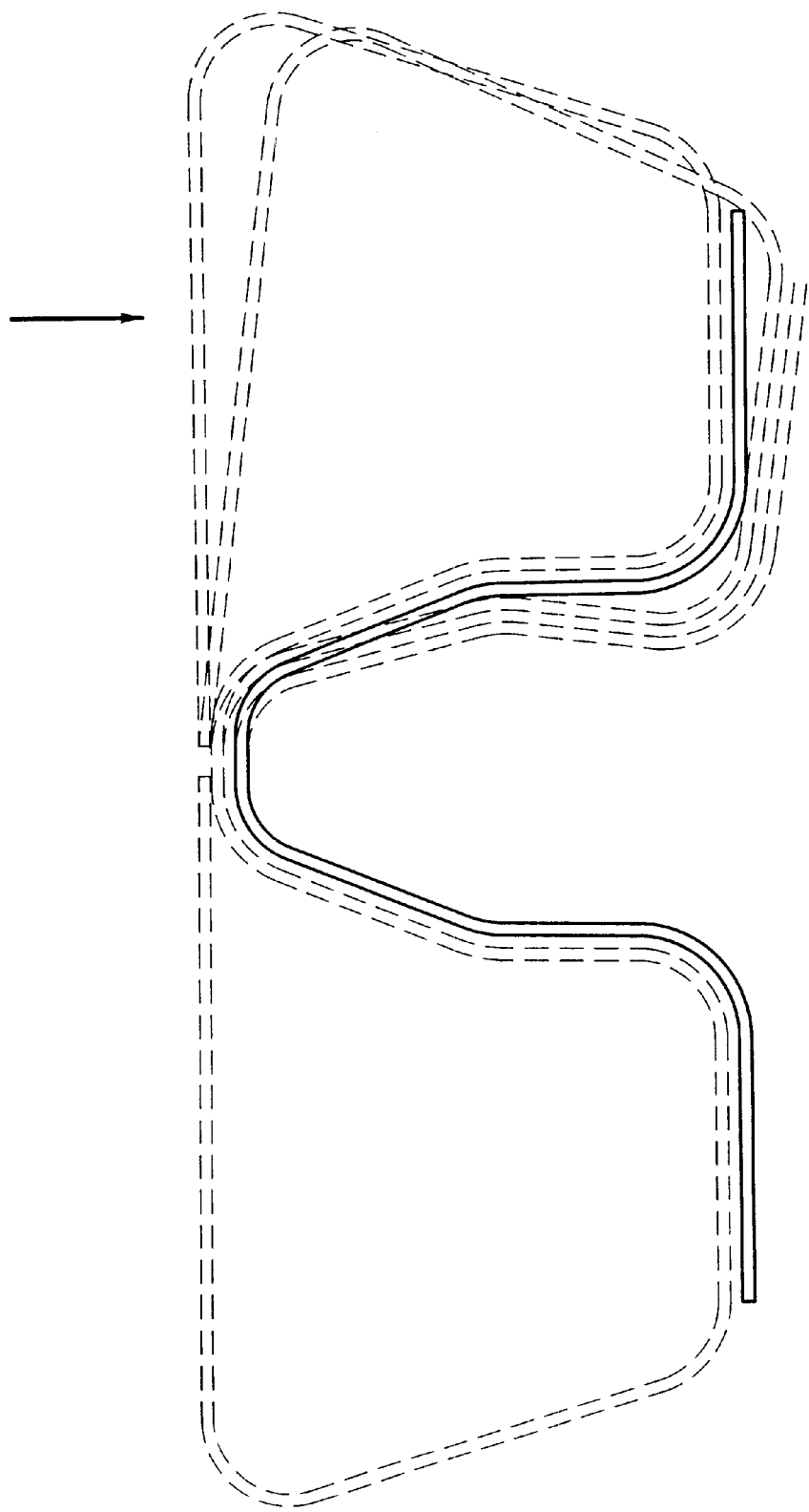
FIG. 6 is a view similar to FIG. 5 illustrating a deformed stage.
Figure 7:
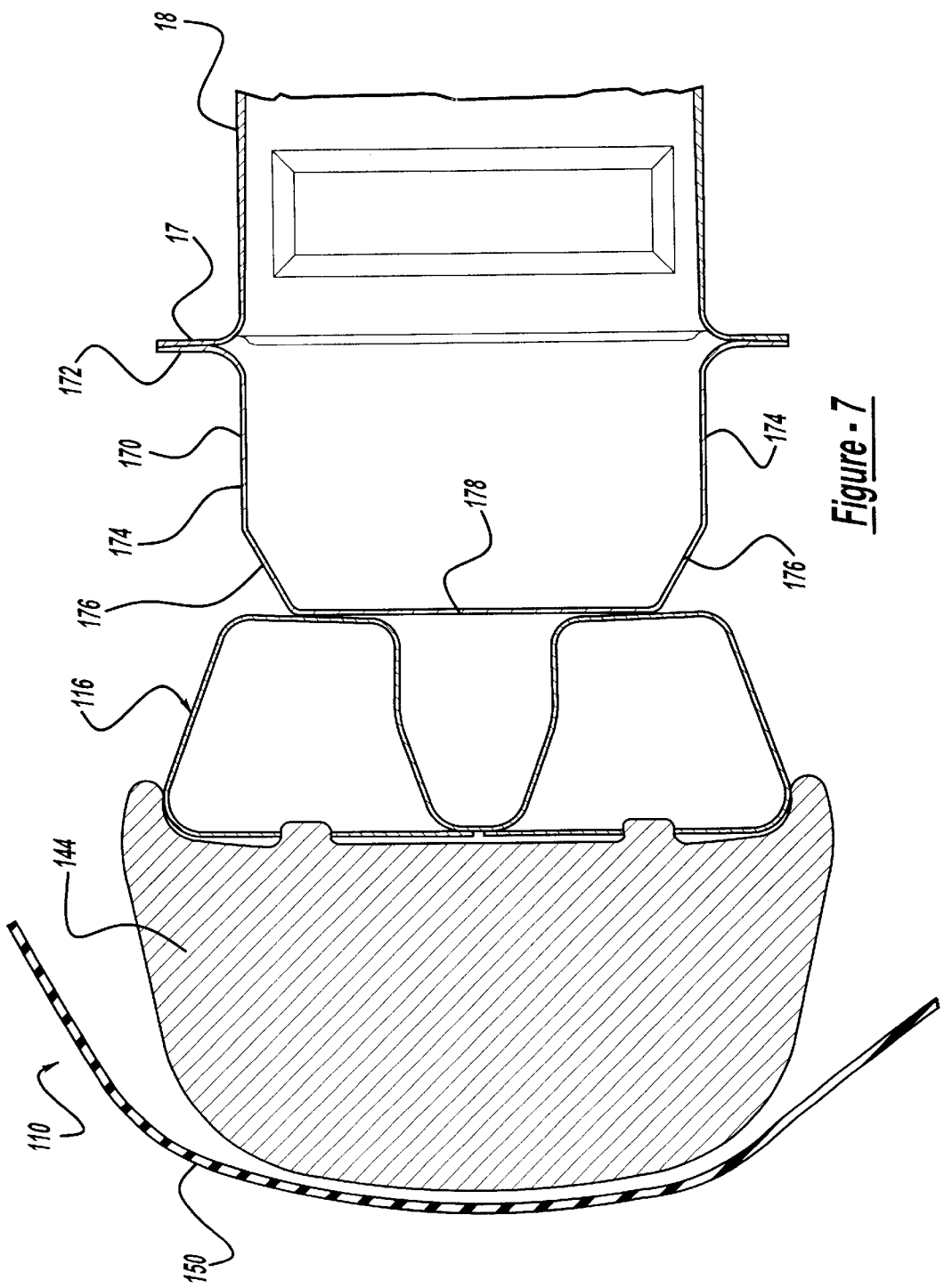
FIG. 7 is a fragmentary elevational view of another embodiment, according to the present invention, of the bumper system of FIG. 1.
Figure 8:
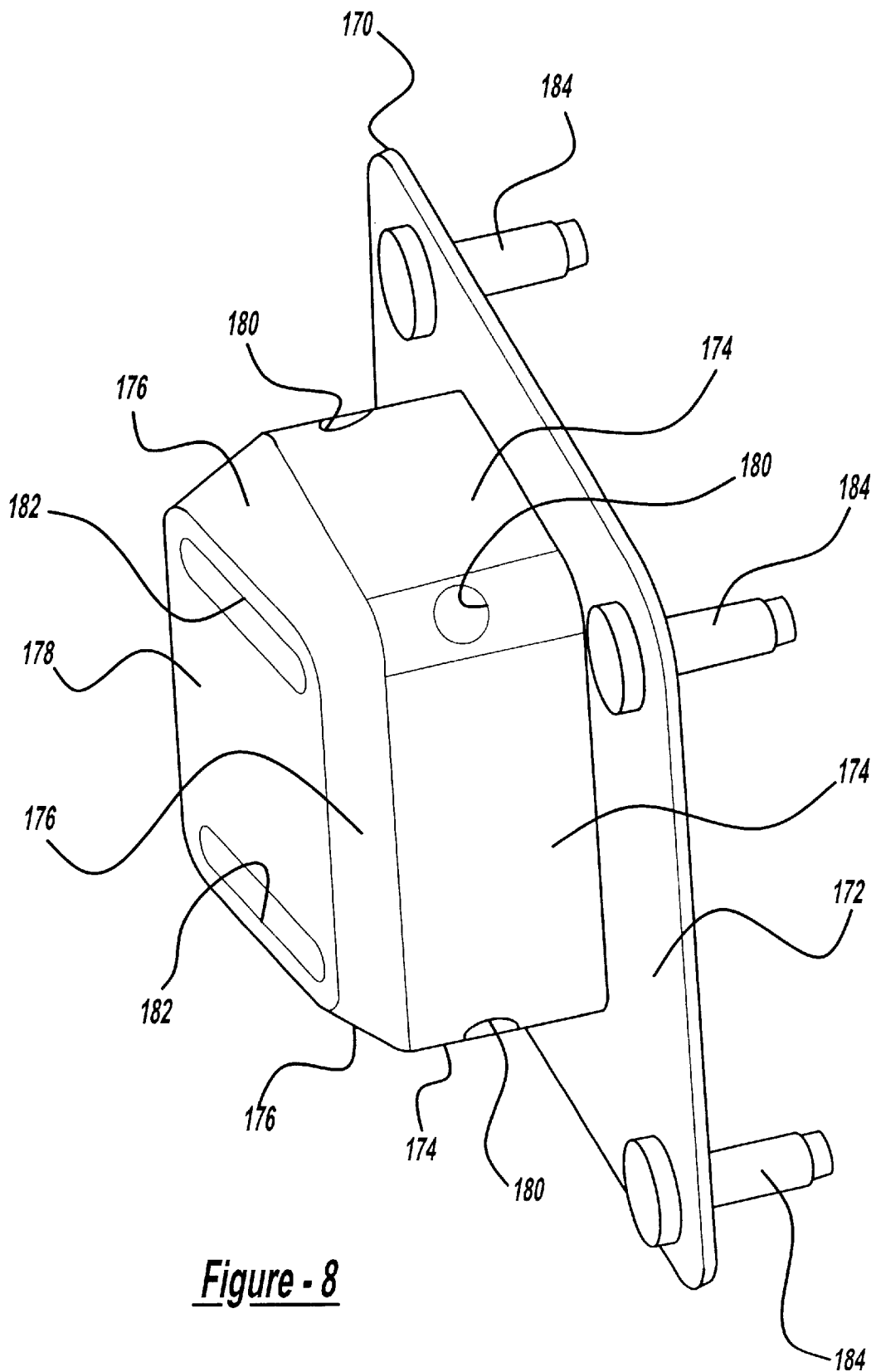
FIG. 8 is a perspective view of a device of the bumper system of FIG. 7.
Figure 9:
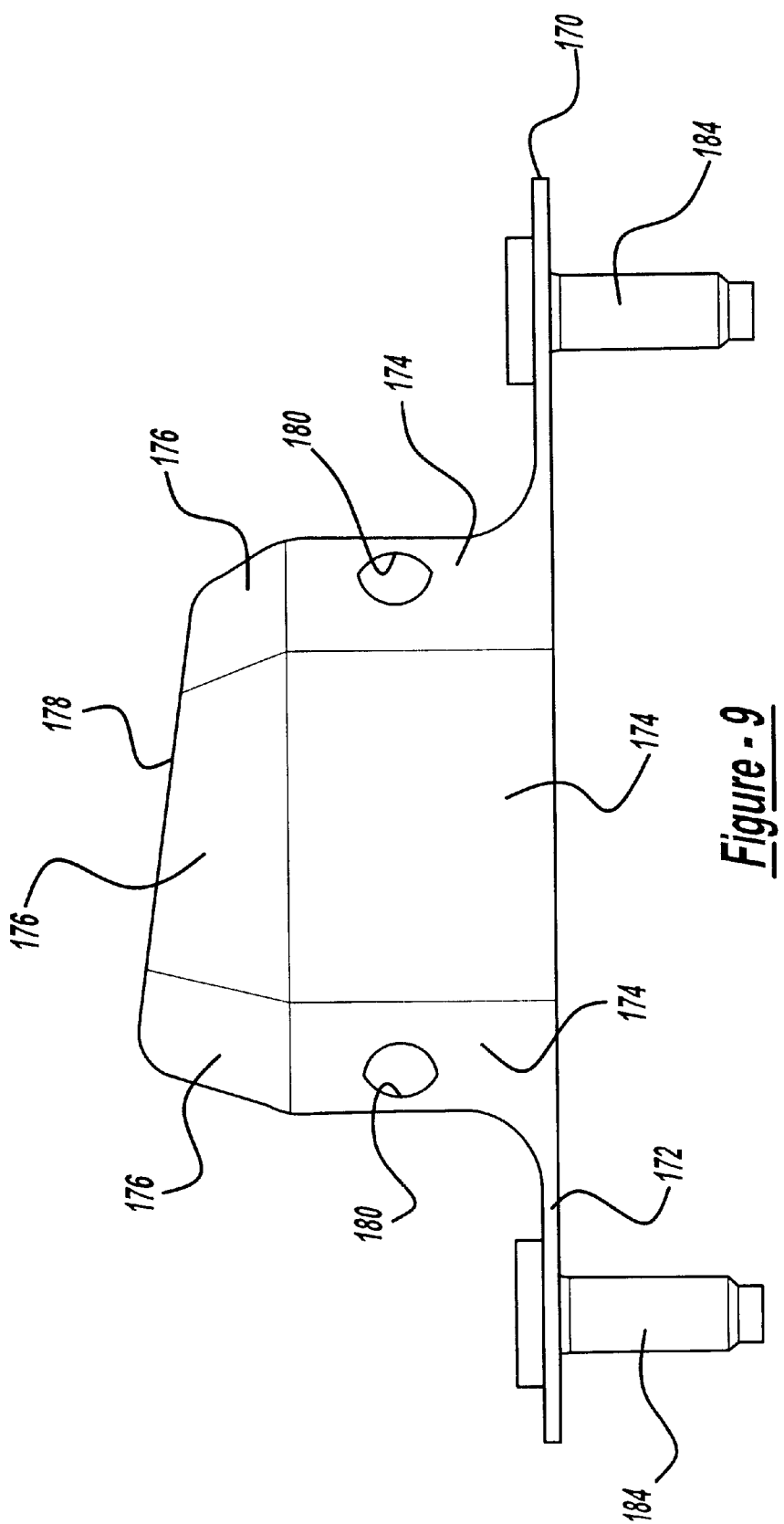
FIG. 9 is a side elevational view of the device of the bumper system of FIG. 7.
Figure 10:
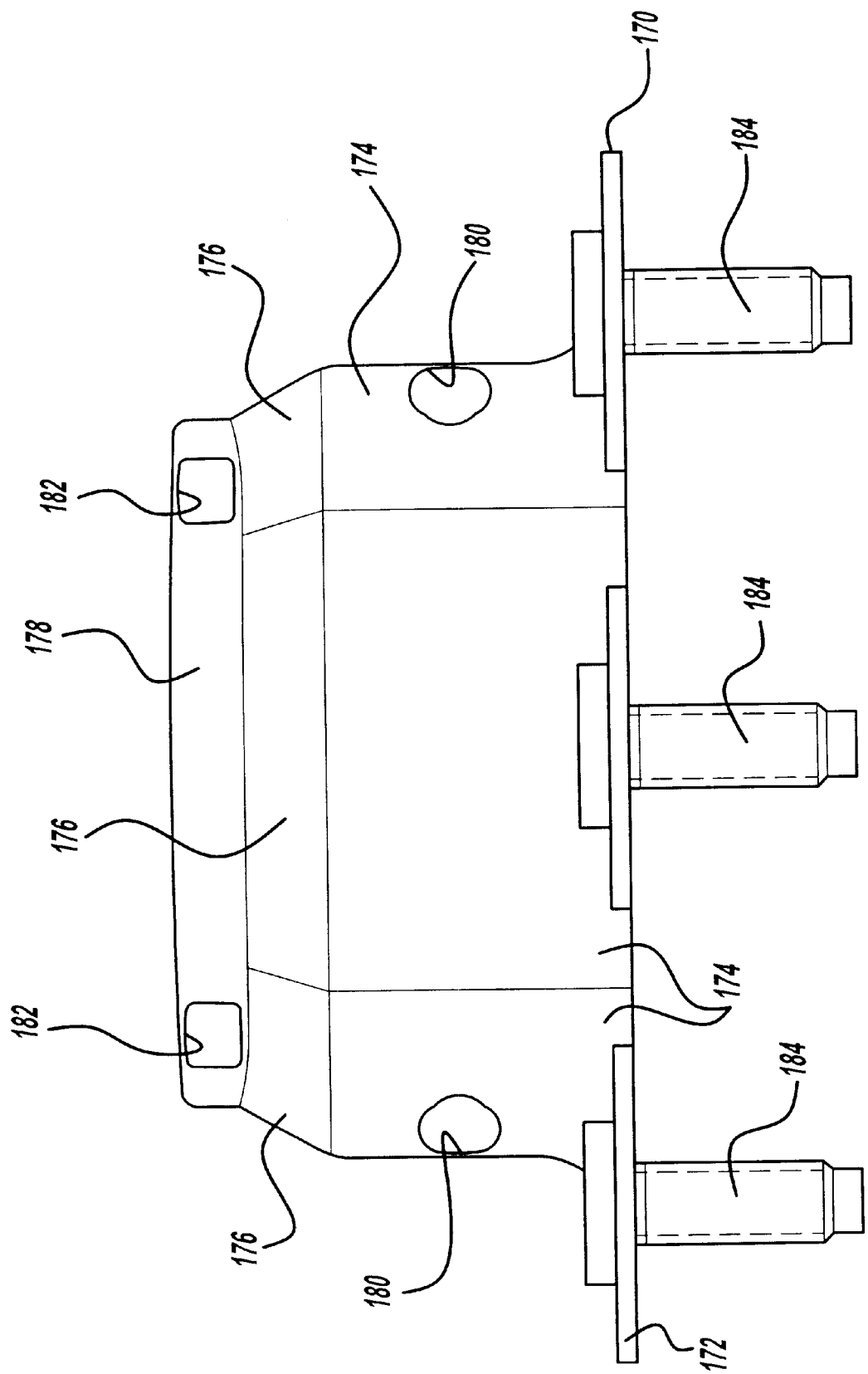
FIG. 10 is a plan view of the device of the bumper system of FIG. 7.

In operation, the bumper system 10 has a first stage or mode. In the first mode at low speeds (i.e., less than or equal to approximately ten miles per hour), the bumper system 10 impacts an object such as a wall. The energy absorber 44 is deformed and absorbs the energy of the impact without deforming the bumper beam 16. In this case, the energy absorber 44 is compressed longitudinally and expands vertically to absorb the impact energy and the slower impact speed will not have a tendency to deform or collapse the bumper beam 16. As illustrated in FIG. 6, the reinforcement 52 allows the bumper beam 16 to elastically twist or bend without a permanent dent in the bumper beam 16, thereby preventing replacement of the bumper beam 16.

The bumper system 10 has a second stage or mode. In the second mode at high speeds (i.e., greater than approximately ten miles per hour), the bumper system 10 impacts an object such as the wall and the reinforcement 52 allows the bumper beam 16 to crush at centerline and limit intrusion into an occupant compartment of the vehicle 12. The two interior walls 32 initiate first stage plastic hinge points around the corner walls 34 to deform the walls 32 partially due to its geometry and partially due to the partial supporting of the vehicle structure such as the rail 18. The deformable material of the energy absorber 44 will be locally extruded into the hollow interior of the bumper beam 16 through the apertures 42 in the impact wall 20. The upper and lower walls 22 and 24 initiate second stage plastic hinge points around the corner walls 26 to deform the upper and lower walls 22 and 24 of the bumper beam 16. The bumper beam 16 will finally go into its compact stage by total deformation of all generally horizontal walls 22, 24, and 32. It should be appreciated that the reinforcement 52 allows the bumper system 10 to absorb more energy than traditional designs that hold their shape and transfer energy to other structure of the vehicle 12. It should also be appreciated that the reinforcement 52 has less of a plan view arch shape or sweep than the bumper beam 16 itself, thereby allowing the reinforcement 52 to be made of less formable yet higher strength lower thickness steel which saves vehicle weight. It should further be appreciated that the reinforcement 52 reduces the moment or non-axial forces on the bumper beam 16 foundation points and acts as a "tie bar" or two-force member sharing the forces of the impact rather than allowing concentration of stresses at the bumper beam mounting points.

Referring to FIGS. 7 through 10, another embodiment 110, according to the present invention, of the bumper system 10 is shown. Like parts of the bumper system 10 have like reference numerals increased by one hundred (100). In this embodiment illustrated in FIG. 7, the bumper system 110 eliminates the reinforcement 52 described above and incorporates an energy absorbing member or device 170. The energy absorbing device 170 efficiently absorbs energy after the bumper beam 116 has collapsed, in turn, protecting the frame and structure of the vehicle 12, which is expensive to repair. The energy absorbing device 170 has a supporting wall 172 and side walls 174 extending from the supporting wall 172 to form a box-like cross-section. The energy absorbing device 170 also has inclined transition walls 176 extending from the side walls 174 to an end wall 178 to form a closed section. The end wall 178 is inclined relative to a plane parallel to the supporting wall 172. The energy absorbing device 170 may include first apertures 180 extending through the side walls 174 and/or second apertures 182 through the end wall 178. The energy absorbing device 170 is made of a metal material such as steel and is integral, unitary, and formed as a one-piece stamping by a stamping process, which is conventional and known in the art. The energy absorbing device 170 is secured to an end of the rails 18 by suitable means such as fasteners 184 extending through the supporting wall 172 and a wall of the forward end 17 of the rails 18. The operation of the bumper beam 116 is similar to the bumper beam 16.

Figure 11:
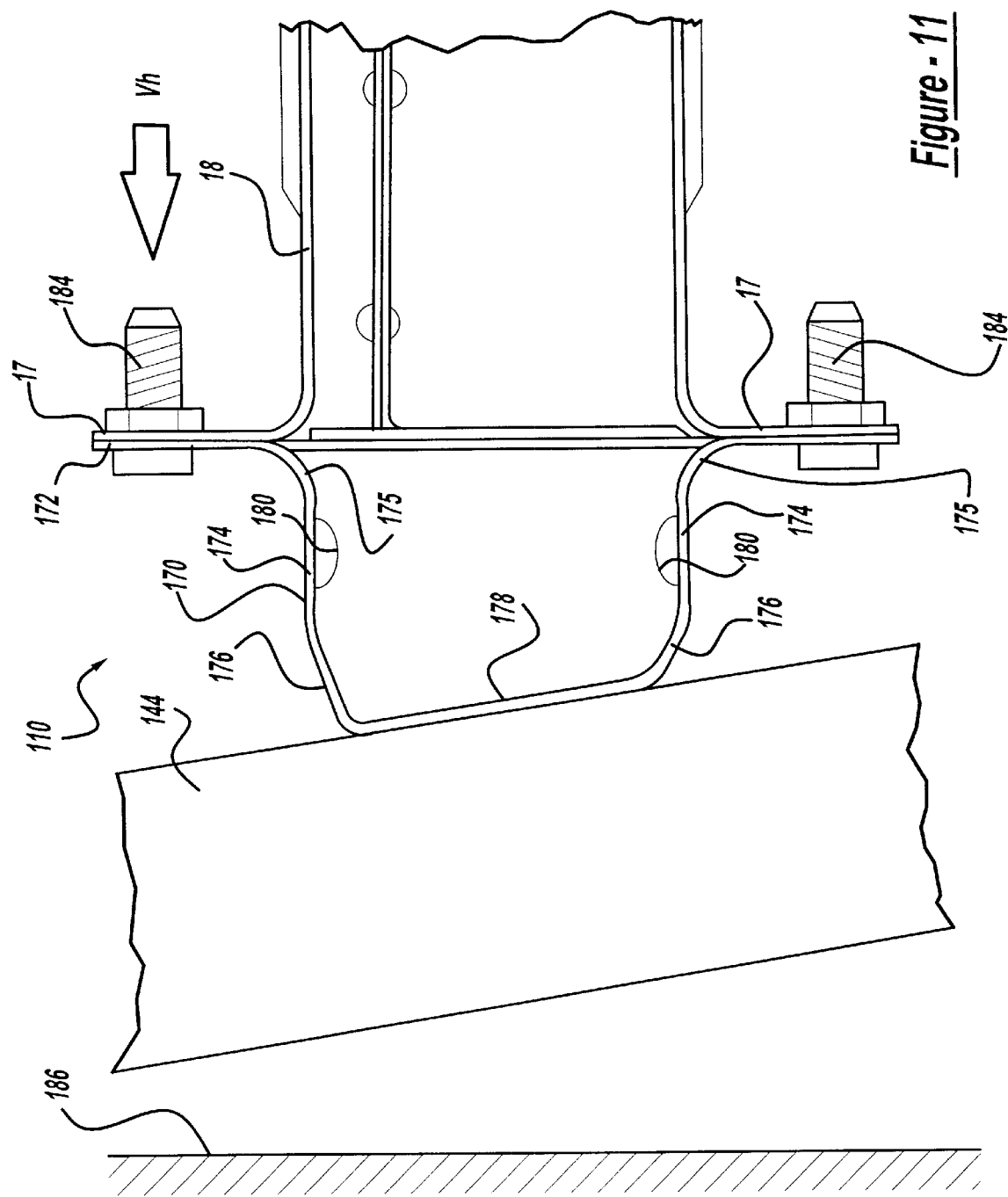
FIG. 11 is a fragmentary plan view of the bumper system of FIG. 7 illustrating a first stage of a high-speed impact.
Figure 12:
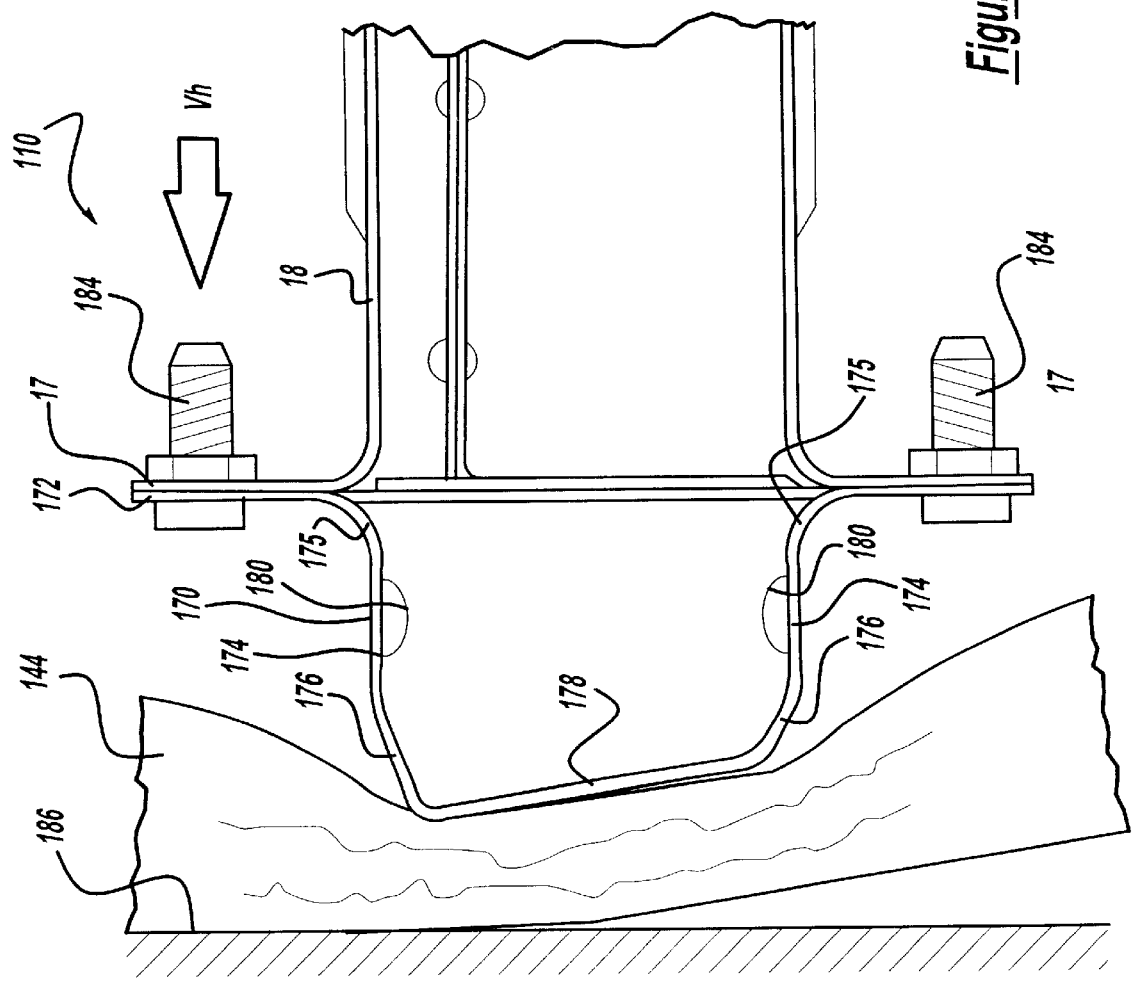
FIG. 12 is a view similar to FIG. 11 illustrating a second stage of a high-speed impact.

In operation, the bumper system 10 has a first stage or mode as illustrated in FIGS. 11 and 12. In the first mode at low speeds (i.e., less than or equal to approximately ten miles per hour), the bumper system 110 impacts an object such as a wall 186. The energy absorber 144 is deformed and absorbs the energy of the impact without deforming the bumper beam 116. In this case, the energy absorber 144 is compressed longitudinally and expands vertically to absorb the impact energy and the slower impact speed will not have a tendency to deform or collapse the bumper beam 116.

Figure 13:
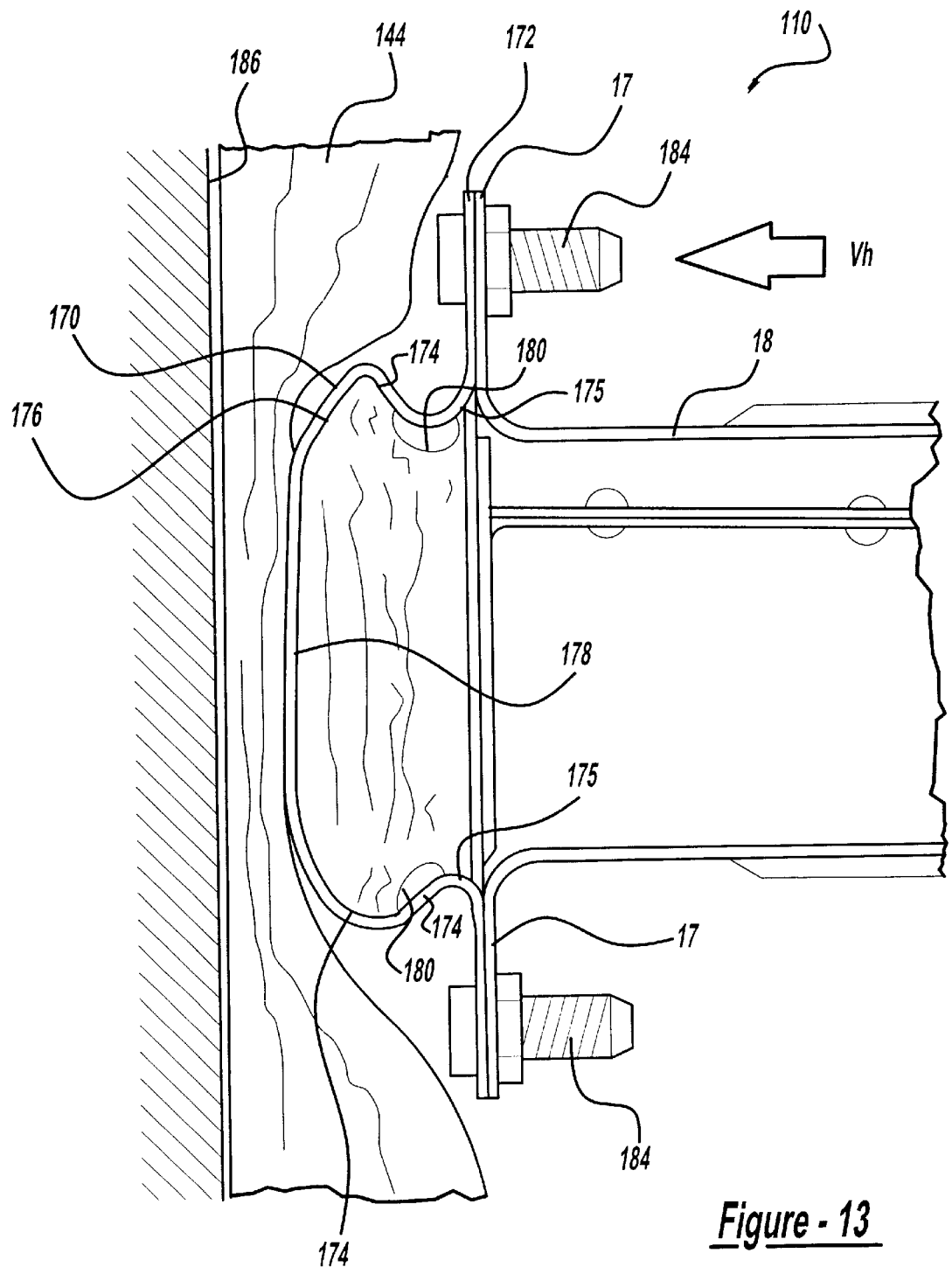
FIG. 13 is a view similar to FIG. 11 illustrating a third stage of a high-speed impact.
Figure 14:
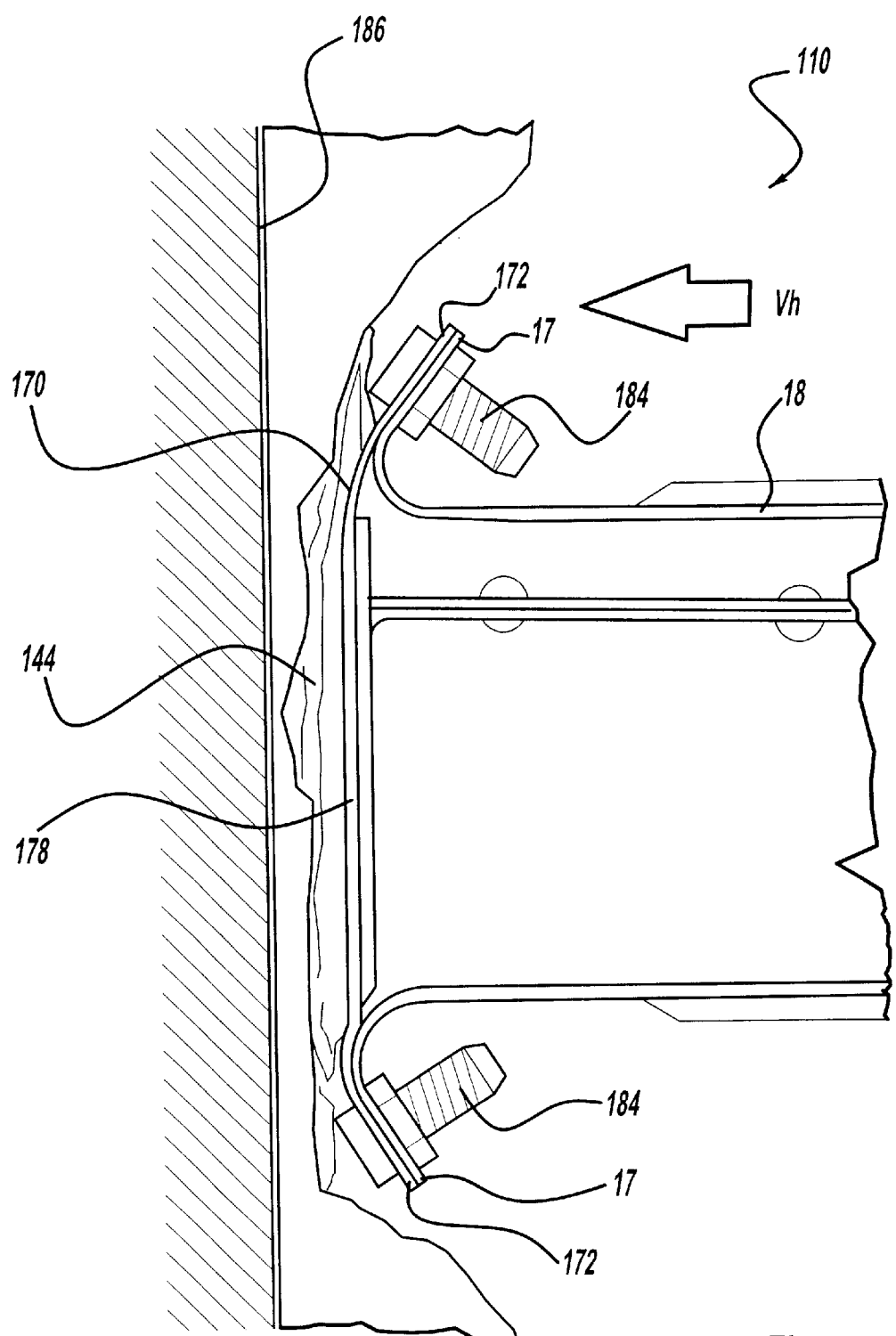
FIG. 14 is a view similar to FIG. 11 illustrating a fourth stage of a high-speed impact.

Referring to FIGS. 12 and 14, the bumper system 110 has a second stage or mode as illustrated. In the second mode at high speeds (i.e., greater than approximately ten miles per hour), the bumper system 110 impacts an object such as the wall 186. After the bumper beam 116 finally go into its compact stage by total deformation, the energy absorbing device 170 undergoes deformation. The two side walls 174 initiate first stage plastic hinge points around the corner walls 175 to deform the side walls 174 partially due to its geometry and partially due to the partial supporting of the vehicle structure such as the rail 18. The transition walls 176 initiate second stage plastic hinge points around the corners thereof to deform the transition walls 176 of the energy absorbing device 170 as illustrated in FIG. 13. The energy absorbing device 170 finally goes into its compact stage by total deformation of all the walls 172, 174, 176, and 178 as illustrated in FIG. 14.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A bumper system for a motor vehicle comprising:
   an energy absorber; and
   a bumper beam connected to said energy absorber and adapted for connection to vehicle structure and having a general B shape, said bumper beam having a front wall connected to said energy absorber and a rear wall adapted for connection to the vehicle structure and a projection extending from said rear wall toward said front wall to form a channel therein; and
   a member comprising a reinforcement having a portion extending longitudinally and being at least partially disposed within said channel of said bumper beam, said reinforcement being located between said bumper beam and a rail of the motor vehicle to absorb energy during an impact with an object by said bumper system.

2. A bumper system as set forth in claim 1 wherein said reinforcement has a base wall extending vertically and laterally.

3. A bumper system as set forth in claim 2 wherein said reinforcement has a plurality of side walls extending generally perpendicularly from said base wall and spaced from each other.

4. A bumper system as set forth in claim 3 wherein said reinforcement has a transition wall extending from said side walls toward each other.

5. A bumper system as set forth in claim 4 wherein said reinforcement has a projection wall being arcuate in shape and interconnecting said transition walls.

6. A bumper system as set forth in claim 1 wherein said reinforcement is made of a metal material.

7. A bumper system as set forth in claim 1 wherein said reinforcement is secured to said bumper beam and adapted to be secured to the rail by either one of welds or mechanical fasteners.

8. A bumper system as set forth in claim 1 wherein said bumper beam is integral, unitary, and formed as one-piece.

9. A bumper system for a motor vehicle comprising:

an energy absorber;

a bumper beam interconnecting said energy absorber and vehicle structure and having a general B shape, said bumper beam having a front wall connected to said energy absorber and a rear wall adapted for connection to the vehicle structure and a projection extending from said rear wall toward said front wall to form a channel therein; and a reinforcement having a portion disposed in said channel of said bumper beam, said reinforcement being located between said bumper beam and a rail of the motor vehicle to absorb energy during an impact with an object by said bumper system.

10. A bumper system as set forth in claim 9 wherein said reinforcement has a base wall extending vertically and laterally.

11. A bumper system as set forth in claim 10 wherein said reinforcement has a plurality of side walls extending generally perpendicularly from said base wall and spaced from each other.

12. A bumper system as set forth in claim 11 wherein said reinforcement has a transition wall extending from said side walls inwardly toward each other and a projection wall being arcuate in shape and interconnecting said transition walls.

* * * * *